United States Patent [19]

Trabitzsch et al.

[11] 4,271,058

[45] Jun. 2, 1981

[54] STABLE AQUEOUS SOLUTIONS OF CERTAIN VINYL COPOLYMERS

[75] Inventors: Hans Trabitzsch, Seeheim; Josef Frieser, Weiterstadt; Achim Koschik; Hermann Plainer, both of Darmstadt, all of Fed. Rep. of Germany

[73] Assignee: Röhm GmbH, Darmstadt, Fed. Rep. of Germany

[21] Appl. No.: 47,894

[22] Filed: Jun. 12, 1979

[30] Foreign Application Priority Data

Jul. 1, 1978 [DE] Fed. Rep. of Germany ....... 2829018

[51] Int. Cl.$^3$ ............................................. C08L 33/02
[52] U.S. Cl. ..................... 260/29.6 M; 260/29.6 HN; 148/6.15 R; 210/764; 422/16; 422/17
[58] Field of Search .................... 260/29.6 H, 29.6 M, 260/29.6 HN; 148/6.15 R; 210/764

[56] References Cited

U.S. PATENT DOCUMENTS

| | | | |
|---|---|---|---|
| 2,760,431 | 8/1956 | Beatty | 260/29.6 M |
| 3,026,281 | 3/1962 | Harren | 260/29.6 M |
| 3,900,440 | 8/1975 | Ohara | 260/29.6 M |
| 4,032,496 | 6/1977 | Spencer | 260/29.6 M |
| 4,136,076 | 1/1979 | Daniels | 260/29.6 M |

*Primary Examiner*—Paul R. Michl
*Attorney, Agent, or Firm*—Curtis, Morris & Safford

[57] ABSTRACT

What is disclosed are stable aqueous solutions, useful for example to treat water to stabilize its hardness and to render it anticorrosive or biocidal, containing a dissolved cationic component, such as polyvalent metal cation or a cationic surface active agent, and a dissolved anionic vinyl copolymer comprising both anionic monomer units having a carboxylic acid group and units of a anionic monomer having an ammonium group.

10 Claims, No Drawings

STABLE AQUEOUS SOLUTIONS OF CERTAIN VINYL COPOLYMERS

The present invention relates to aqueous solutions of vinyl copolymers having an anionic character, which solutions contain dissolved cationic surface active agents or polyvalent cationic compounds.

As a rule, such solutions are unstable. Water-soluble anionic vinyl polymers, such as sodium polyacrylate, are precipitated by cationic surface active agents or by polyvalent cations, for example calcium salts or aluminum salts. Solutions which contain both of the aforementioned incompatible components are needed for various purposes, in part because both components are used simultaneously because of their specific functions, and in part because it is difficult or impossible to remove one component from an aqueous mixture before the other component is added.

For example, anionic polyelectrolytes such as sodium polyacrylate are added as hardness-stabilizers in the preparation of cooling water and feed water. Zinc salts are often used as corrosion inhibitors and, to be sure, in amounts which are stoichiometrically far above the equivalent amount of carboxyl groups of the anionic polyelectrolytes. Further, effective cationic surface active agents are used in cooling water systems as biocides to avoid the growth of algae and bacteria. The zinc salts as well as the cationic surface active agents are as a rule not compatible with the hardness-stabilizers and cannot be used together.

In phosphatizing baths a disturbing crust formation occurs as a result of the separation of heavy metal sulfates. In order to avoid this, special stabilizing agents which are difficult to prepare are added to the phosphatizing baths, for example polymers of $\alpha$-oxyacrylic acid. Polyacrylic acid and polymethacrylic acid are as a rule not suitable for this purpose because they are precipitated by the heavy metal ions.

The present invention solves the problem of preparing stable aqueous solutions of vinyl copolymers having anionic groups and of such water-soluble ionic or ionizable compounds which have a precipitating action on aqueous solutions of polyacrylic acid or other anionic polyelectrolytes.

The new aqueous solutions comprise (1) from 20 to 99 percent by weight of water; (2) 0.5 to 79 percent by weight of a water-soluble vinyl copolymer, and (3) 0.5 to 79 percent by weight of at least one water-soluble ionic or ionizable compound which has a precipitating effect on an aqueous solution of polyacrylic acid. The vinyl copolymer in turn comprises (A) from 10 to 90 mol percent, preferably from 50 to 80 mol percent, of an $\alpha,\beta$-unsaturated carboxylic acid, (B) from 10 to 90 mol percent, preferably from 20 to 50 mol percent, of a vinyl monomer containing ammonium groups, and, as an optional component, from 0 to 80 mol percent of units of at least one further non-ionic comonomer copolymerizable with monomers (A) and (B).

The invention is based on the surprising recognition that water-soluble vinyl copolymers which contain cationic groups in addition to anionic groups give stable solutions with oppositely-charged ionic compounds which in the absence of the cationic groups would have a precipitating effect on the dissolved anionic polyelectrolyte. The water-soluble anionic vinyl copolymers which are contained in the solutions according to the present invention need not have a predominantly anionic character providing only that they are capable of producing the effects required of an anionic polyelectrolyte, for example producing a hardness-stabilizing effect. This effect can also exist if the number of cationic groups in the vinyl copolymer is larger than the number of anionic groups.

Unlimited compatibility between the otherwise-incompatible ionic compounds does not exist in all cases. However, in each case an improved compatibility is achieved in comparison to pure anionic polyelectrolytes. For example, improved compatibility can be observed at particular temperatures, concentrations, or pH values. There are other cases in which compatibility problems of anionic polyelectrolytes with counter-ionic compounds arise only under certain disadvantageous conditions. But also in these cases the region of incompatibility can be narrowed using the findings of the invention.

The solutions according to the present invention contain the components previously identified as (2) and (3) in dissolved form. In addition, the solutions can contain further dissolved or undissolved components according to the requirements of their intended use.

The Vinyl Copolymer (2)

The vinyl copolymer forming component (2) is formed from vinyl monomers, i.e. monomers having a free-radically polymerizable or at least co-polymerizable carbon- carbon double bond in the form of a vinyl group, a vinylidene group, or a vinylene group. The vinyl copolymers according to the present invention can be formed exclusively from the monomer units (A) and (B) or contain at least 20 mol percent of these units. Preferably, the portion of anionic monomer units (A) predominates over the cationic monomer units (B). The preferred vinyl copolymers contain from 50 to 80 mol percent of units (A) and from 20 to 50 mol percent of units (B).

The units (A) are derived from polymerizable $\alpha,\beta$-unsaturated carboxylic acids. Maleic acid, fumaric acid, itaconic acid, crotonic acid and the preferred acrylic acid and methacrylic acid belong to this group. These acids are contained in the dissolved vinyl copolymer as such and not in the form of their salts. As a result, the solutions are acid; their pH value is below 6, as a rule between 2 and 5.

The units (B) contain ammonium groups. These can be primary, secondary, tertiary, or quaternary ammonium groups. Tertiary and quaternary ammonium groups are preferred. The primary, secondary, and tertiary ammonium groups are derived from primary, secondary, or tertiary amino groups which have been converted into ammonium salt form by reaction with an acid.

A particularly important group of monomers from which the unit (B) can be derived by salt formation with acid or by quaternization are the aminoalkyl esters and N-(aminoalkyl)-amides of $\alpha,\beta$-unsaturated monocarboxylic and dicarboxylic acids, in particular of acrylic acid and methacrylic acid. The amino groups are preferably substituted and, to be sure, with alkyl groups, preferably two alkyl groups, each having one to four carbon atoms or the amino-groups form a piperidino, morpholino, or piperazino group. Preferred examples of these monomer groups are dimethylaminoethyl-acrylate and -methacrylate, diethylaminoethyl-acrylate and -methacrylate, and N-(dimethylaminopropyl)-acrylamide and -methacrylamide.

The ammonium groups can be present as salts of inorganic or organic acids, such as hydrochloric acid, sulfuric acid, methyl hydrogen sulfate, acetic acid, or chloroacetic acid. The quaternary ammonium groups are preferably generated from tertiary amino groups by reaction with methyl chloride or dimethyl sulfate.

The monomer units (C) optionally present in the copolymer are neither ionic nor ionizable, but can derive from water-soluble monomers, for example from acrylamide and methacrylamide, vinyl pyrrolidone, hydroxyalkyl esters of $\alpha,\beta$-unsaturated polymerizable monocarboxylic or dicarboxylic acids, particularly those having from two to four carbon atoms in the hydroxylalkyl group, as well as from the hypothetical monomer vinyl alcohol. The monomer units (C) can also be derived from water-insoluble comonomers to the extent that the water solubility of the polymer remains. Such water-insoluble monomers include the alkyl esters (particularly those of $C_{1-4}$-alcohols) and nitriles of $\alpha,\beta$-unsaturated carboxylic acids, vinyl esters of fatty acids, vinyl halides, vinyl aromatic compounds, $\alpha$-olefins, and/or dienes. The preferred water-soluble vinyl copolymers contain not more than 30 mol percent of monomer units (C) and, among these, not more than 20 mol percent of units of water-insoluble comonomers of the aforementioned kind.

Typical water-soluble vinyl copolymers for use as hardness-stabilizers and additives for phosphatizing baths have an anionic character and contain units (A) and (B) in ratios from 2:1 to 4:1, generally without monomer units (C). Acrylic acid is the particularly preferred monomer for the synthesis of these polymers. In addition thereto, or in its place, methacrylic acid, maleic acid, fumaric acid, and itaconic acid can be introduced. If mixtures of different unsaturated carboxylic acids take part in the synthesis of the copolymer, acrylic acid usually forms the major portion of component (A). The vinyl copolymers for the aforementioned fields of use preferably contain, as units (B), those units having tertiary or, particularly, quaternary ammonium groups. Methacryloxyethyl-trimethyl-ammonium chloride is a preferred monomer for the synthesis of units (B). Acryloxyethyltrimethyl-ammonium chloride or the hydrochloride of dimethylaminoethyl-acrylate or -methacrylate can be used with almost equally good effect. Since a very good water solubility is necessary, units (C), to the extent they may be present, are preferably formed from water-soluble comonomers, of which the hydroxyalkyl esters of acrylic acid or methacrylic acid can be mentioned as examples. They are, for example, introduced in amounts from 10 to 25 mol percent.

There are a number of methods for the preparation of water-soluble polymers according to which the vinyl copolymers (2) to be used according to the present invention can be prepared. In addition to the polymerization of relatively dilute aqueous monomer solutions under the influence of water-soluble free radical formers, primarily such methods have achieved significance in which highly concentrated aqueous monomer solutions are polymerized with the aid of water-soluble free radical formers or ultra-violet light. In this way, hard polymers, available as solid products, are formed which are then dissolved in water in the desired concentration before use. The polymerization can take place in film bags according to Belgian Pat. No. 695,342, in open pans according to German Pat. No. 1,770,588, on an endless belt according to German Offenlegungsschrift No. 2,545,290, by bead polymerization in a non-aqueous phase according to German Offenlegungsschrift No. 2,009,218, and as a suspension polymerization in oil according to German Offenlegungsschrift No. 2,322,883 with the formation of a stable organosol which is soluble in water. The molecular weight of the vinyl copolymer (2) can be between 1000 and 1 million. Preferably, the copolymers are prepared in the presence of chain length regulators and have molecular weights between 1000 and 50,000.

The Ionic or Ionizable Compound (3)

The compounds of this group form water-insoluble salts or complexes with pure anionic polyelectrolytes such as polyacrylic acid or its salts, which water-insoluble salts or complexes precipitate from the aqueous solution. The precipitating effect can be observed as a clouding, as a flocculation, or as the formation of larger insoluble aggregates, for example a sediment. Occasionally, these precipitations first occur at certain temperatures, concentrations, or pH values. The precipitating effect is caused by the cationic component of compound (3). Compound (3) is either a compound, formed from anions and cations, which dissociates partially or completely in aqueous solution or compound (3) forms a dissociated compound in aqueous solution, such as amines which form dissociated ammonium hydroxide. The cations present in the aqueous solution then have precipitating effect on polyacrylic acid either if they have several charges or if they are bound to a larger hydrophobic group, i.e. are cationic surface active agents.

Polyvalent cations having a precipitating effect include, for example, the cations of water-soluble salts of polyvalent metals such as calcium, barium, aluminum, titanium, zirconium, cerium, chromium, molybdenum, tungsten, manganese, iron, cobalt, nickel, copper, zinc, cadmium, tin, and lead.

Low molecular weight and high molecular weight compounds having a majority or multiplicity of amino groups or ammonium groups exert precipitating effects of differing intensity. Polyacrylic acid is incompatible with ethylene diamine, diethylene triamine, triethylene tetramine, and the higher homologs of this series up to polyethylenimine. In contrast, these compounds form stable solutions together with copolymers of acrylic acid and small molar amounts of dimethylaminoethyl-methacrylate-hydrochloride. Cationic polymers of dialkylaminoalkyl esters of acrylic acid or methacrylic acid behave similarly to polyethylenimine.

Cationic surface active agents having a precipitating effect in the above-described sense contain an ammonium salt group which contains at least one hydrophobic group having six or more carbon atoms, preferably 10 to 30 carbon atoms. These latter can be aliphatic groups such as ($C_{12-18}$)-n-alkyl groups, aromatic groups such as naphthyl groups, or araliphatic groups such as benzyl groups. As a rule, the cationic surface active agents contain one or two such hydrophobic groups and one or two lower aliphatic groups such as methyl, ethyl, or propyl groups. Typical examples of cationic surface active agents of this type are ($C_{12-18}$)-alkyl-dimethyl-benzyl-ammonium chloride and (diisobutyl-phenoxy-ethoxyethyl)-dimethyl-benzyl-ammonium-chloride.

The Relative Proportions of Compounds (2) and (3)

The ionic compounds belonging to component (3) do not have an equally strong precipitating effect in all cases. Some of these compounds, for example many salts of polyvalent metals such as aluminum, chromium (III), or iron salts, and similar heavy metal salts already have a precipitating effect on anionic homopolymers if they are present in stoichiometrically smaller amounts than the carboxyl groups of units (A) in the vinyl copolymer. The invention encompasses solutions containing less than stoichiometric amounts and more than stoichiometric amounts of cationic charge of a compound (3) having a strong precipitating effect.

Many of the materials belonging to the class of compounds (3), for example most of the cationic surface active agents, first have a precipitating effect on polyacrylic acid when they are present in more than stoichiometric amounts. Aqueous solutions containing a stoichiometric excess of the compound (3) relative to the carboxyl groups of units (A) thus form a preferred embodiment of the present invention.

For use as a hardness-stabilizing agent, the solutions of the present invention are employed as stock solutions having a solids content, for example, between 10 and 60 percent by weight and are added to the water to be stabilized in amounts of, for example, 0.2 to 500 parts per million. Stock solutions having smaller solids concentrations (1–10 percent by weight) may be desirable in order to permit a more exact dosing. At still lower concentrations, the incompatibility phenomena disappear so that there is no need to use the invention at these levels.

A better understanding of the present invention and of its many advantages will be had by referring to the following specific examples, given by way of illustration.

EXAMPLE 1

For the preparation of water-treating agents according to the present invention, the following predominantly anionic vinyl copolymers were used (all parts are molar parts):

(A)

75 parts of acrylic acid,
25 parts of methacryloxyethyl-trimethylammonium-chloride;

(B)

73 parts of acrylic acid,
27 parts of acryloxyethyl-trimethylammonium-chloride;

(C)

73 parts of acrylic acid,
27 parts of dimethylaminoethyl-methacrylatehydrochloride;

(D)

47 parts of acrylic acid,
26 parts of methacrylic acid,
27 parts of methacryloxyethyl-trimethylammonium-chloride; and (E)

18 parts of acrylic acid,
45 parts of methacrylic acid,
37 parts of methacryloxyethyl-trimethylammonium-chloride.

For comparison, the following pure anionic polymers were used:

(F)

100 parts of acrylic acid;

(G)

30 parts of acrylic acid,
70 parts of methacrylic acid;

(H)

70 parts of acrylic acid,
30 parts of maleic acid; and (J)

24 parts of acrylic acid,
62 parts of methacrylic acid,
14 parts of hydroxyethyl methacrylate.

All polymers were prepared as 40 percent solutions in water and used in this form. The molecular weight was about 10,000.

Water-treating agents having a hardness-stabilizing effect and a biocidal or corrosion-inhibiting effect were prepared as follows. (The parts are parts by weight of the dry substance):

(I)

20 parts of polymers A–J,
20 parts of (diisobutylphenoxy-ethoxyethyl)dimethyl-benzyl-ammonium chloride;

(II)

20 parts of polymers A–J,
17.5 parts of ($C_{12-18}$)-alkyl-dimethyl-benzylammonium chloride; and (III)

20 parts of polymers A–J,
20 parts of zinc acetate.

(In each case together with sufficient water to make 100 parts by weight).

The hardness-stabilizing effect of polymers A–J toward water of 16 German degrees of hardness (=16 parts of CaO per 100,000 of water) at a dosage rate of 1 ppm of polymer after 24 hours at 95° C. is given in column 1 in following Table 1. In columns 2–4, the compatibility (+) or incompatibility (−), of water-treating agents I–III in aqueous solution is indicated, in each case referring to a polymer content of one percent by weight.

TABLE 1

| Polymer | Hardness-Stabilization (%) | I (Cationic Surface Active Agent) | II (Cationic Surface Active Agent) | III[Zn(OAc)$_2$] |
|---|---|---|---|---|
| | 1 | 2 | 3 | 4 |
| A | 97.8 | + | + | + |
| B | 98.0 | + | + | + |
| C | 97.7 | + | + | + |
| D | 98.0 | + | + | + |
| E | 81.3 | + | + | + |
| Comparison Tests: | | | | |
| F | 97.6 | − | − | − |
| G | 98.1 | − | − | − |
| H | 98.0 | − | − | − |
| J | 98.0 | − | − | − |

A water treating agent having both a hardness-stabilizing effect and an anti-bacterial effect has the following composition (in parts by weight):

(IV)

3 parts of vinyl copolymer A, B, C, or D,
10 parts of zinc acetate,
10 parts of (diisobutylphenoxy-ethoxyethyl)-dimethyl-benzyl-ammonium-chloride,
77 parts by weight of water.

The solution is clear and stable and is suitable, for example, for continuous dosing into a circulating cooling water system.

EXAMPLE 2

The feed water of a steam generator contains a water-soluble vinyl copolymer having anionic character as a hardness-stabilizing agent and a polyfunctional amine as a corrosion inhibiting component. In addition to the vinyl polymers A, B, C, D, and F (a comparison substance) from Example 1, the following polymers were used (parts are molar parts):

(K)

25 parts of acrylic acid,
60 parts of methacrylic acid,
15 parts of methacryloxyethyl-trimethylammonium-chloride;

(L)

44 parts of acrylic acid,
36 parts of methacrylic acid,
20 parts of methacryloxyethyl-trimethylammonium-chloride; and (M)

50 parts of acrylic acid,
20 parts of maleic acid,
30 parts of methacryloxyethyl-trimethylammonium-chloride.

For testing compatibility, 10 weight percent aqueous solutions of the polymers are mixed at room temperature with 10 weight percent solutions of ethylene diamine, diethylene triamine, or triethylene tetramine in such ratios that one amino group is present for each carboxyl group of the copolymer. The stable mixtures remain clear. Incompatibility can be recognized by a cloudiness.

TABLE 2

| Polymer | Compatibility With | | |
| --- | --- | --- | --- |
| | Ethylene-diamine | Diethylene-triamine | Triethylene-tetramine |
| A | ++ | ++ | ++ |
| B | ++ | ++ | ++ |
| C | ++ | ++ | ++ |
| D | ++ | ++ | ++ |
| K | + | + | + |
| L | ++ | ++ | ++ |
| M | ++ | ++ | ++ |
| Comparison Test: | | | |
| F | − | − | − |

++ = clear, compatible
+ = very slight clouding, limit of compatibility
− = cloudy, incompatible

EXAMPLE 3

The vinyl copolymers A, B, C, D, E, and M described in Examples 1 and 2 and the polymers N and O described below are used as a crust-inhibiting additive to phosphatizing baths in amounts of about 1 gram per liter. At a pH value of 3–5, the separation of crusts of heavy metal phosphates was extensively inhibited. The heavy metal phosphates are principally retained in solutions or in part separate out as filtrable flakes.

Polymer N 70 molar parts of acrylic acid,
20 molar parts of acryloxyethyl-trimethylammonium-chloride,
10 molar parts of 2-hydroxyethyl acrylate;

Polymer O 65 molar parts of acrylic acid,
14 molar parts of methacryloxyethyl-trimethylammonium-chloride,
21 molar parts of 2-hydroxypropyl acrylate.

What is claimed is:

1. An aqueous solution comprising
   (1) 20 to 99 percent by weight of water;
   (2) 0.5 to 79 percent by weight of a water-soluble vinyl copolymer comprising
      (A) 10 to 90 mol percent of units of an $\alpha,\beta$-unsaturated carboxylic acid,
      (B) 10 to 90 mol percent of units of a cationic vinyl monomer containing ammonium groups, and
      (C) 0 to 80 mol percent of units of one or more further non-ionic comonomers copolymerizable with monomers (A) and (B); and
   (3) 0.5 to 79 percent by weight of at least one water-soluble ionic or ionizable compound having a precipitating effect on an aqueous solution of polyacrylic acid.

2. An aqueous solution as in claim 1 wherein said ionic or ionizable compound (3), is present in an amount, calculated in ionic charge equivalents, which is stoichiometrically greater than the carboxyl groups in said vinyl copolymer (2).

3. An aqueous solution as in claim 1 wherein said ionic or ionizable compound (3) is at least one member selected from the group consisting of salts of a polyvalent metal cation, organic diamines or polyamines, water-soluble organic polymers or copolymers of monomers having amino groups or ammonium groups, and cationic surface active agents.

4. An aqueous solution as in claim 3 wherein said ionic compound (3) is a salt of a polyvalent metal cation, a cationic surface active agent, or a mixture thereof.

5. An aqueous solution as in claim 4 wherein said salt of a polyvalent metal cation is a zinc salt.

6. An aqueous solution as in claim 1 wherein said vinyl copolymer (2) comprises 50 to 80 mol percent of (A) units of an $\alpha,\beta$-unsaturated carboxylic acid.

7. An aqueous solution as in claim 1 wherein said vinyl copolymer (2) comprises from 20 to 50 mol percent of (B) units of a cationic vinyl monomer containing ammonium groups.

8. The method of treating water to stabilize its hardness and to render it anti-corrosive or biocidal, which method comprises adding to said water an effective amount of an aqueous solution as in claim 1.

9. A method as in claim 8 wherein said water is cooling water or is feed water for a steam generator.

10. The method of treating a phosphatizing bath for metals to inhibit crust formation in said bath, which method comprises adding to said bath an effective amount of an aqueous solution as in claim 1.

* * * * *